(12) United States Patent
Shimomura et al.

(10) Patent No.: US 10,290,317 B2
(45) Date of Patent: May 14, 2019

(54) FLUID BEARING APPARATUS, MOTOR, AND DISK DRIVE APPARATUS

(71) Applicant: Nidec Corporation, Kyoto (JP)

(72) Inventors: Takumi Shimomura, Kyoto (JP); Masahiro Imahori, Kyoto (JP); Shingo Suginobu, Kyoto (JP); Katsuya Takahashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/928,184

(22) Filed: Mar. 22, 2018

(65) Prior Publication Data

US 2018/0315450 A1 Nov. 1, 2018

(30) Foreign Application Priority Data

Apr. 27, 2017 (JP) ................................. 2017-088596

(51) Int. Cl.
  *F16C 17/10* (2006.01)
  *G11B 19/20* (2006.01)

(52) U.S. Cl.
  CPC ........ G11B 19/2036 (2013.01); F16C 17/102 (2013.01); *F16C 2380/26* (2013.01)

(58) Field of Classification Search
  CPC .............. G11B 19/2036; F16C 17/102; F16C 2380/26; F16C 17/107
  See application file for complete search history.

(56) References Cited

U.S. PATENT DOCUMENTS

| 3,870,382 A | * | 3/1975 | Reinhoudt | ............ F16C 17/045 |
| | | | | 384/123 |
| 5,504,637 A | * | 4/1996 | Asada | ................... F16C 33/107 |
| | | | | 360/98.07 |
| 5,977,674 A | * | 11/1999 | Leuthold | ............... F16C 17/107 |
| | | | | 310/90 |
| 6,017,150 A | * | 1/2000 | Lee | ........................ F16C 17/04 |
| | | | | 384/112 |
| 6,276,831 B1 | * | 8/2001 | Takahashi | ............... F16C 17/02 |
| | | | | 384/100 |
| 6,456,458 B1 | * | 9/2002 | Ichiyama | ............... F16C 17/107 |
| | | | | 360/99.08 |
| 6,493,181 B1 | * | 12/2002 | Ichiyama | ............... F16C 17/107 |
| | | | | 360/98.07 |
| 7,374,341 B2 | | 5/2008 | Schmid | |
| 7,625,122 B2 | * | 12/2009 | Huang | .................. F16C 17/026 |
| | | | | 384/100 |

(Continued)

FOREIGN PATENT DOCUMENTS

JP   2002-295457 A   10/2002
JP   2003-130042 A    5/2003
JP   2003-139130 A    5/2003

*Primary Examiner* — Brian E Miller
(74) *Attorney, Agent, or Firm* — Keating & Bennett, LLP

(57) ABSTRACT

A fluid bearing apparatus includes a stationary member and a rotating member. A bearing surface of the stationary member and a bearing surface of the rotating member are arranged opposite to each other with a minute gap therebetween. The minute gap has a fluid arranged therein. At least one of the bearing surfaces includes a first dynamic pressure groove array. The first dynamic pressure groove array includes a plurality of first dynamic pressure grooves arranged unevenly at irregular intervals in a circumferential direction.

16 Claims, 8 Drawing Sheets

(56) References Cited

U.S. PATENT DOCUMENTS

| | | | |
|---|---|---|---|
| 7,677,805 B2* | 3/2010 | Han | F16C 17/045 384/107 |
| 8,628,246 B2* | 1/2014 | Aiello | F16C 17/10 384/100 |
| 2003/0016891 A1* | 1/2003 | Gomyo | F16C 17/045 384/121 |
| 2005/0031237 A1* | 2/2005 | Gomyo | F16C 17/026 384/110 |
| 2006/0051001 A1* | 3/2006 | Nishimura | F16C 17/107 384/100 |
| 2006/0082923 A1 | 4/2006 | Osawa et al. | |
| 2007/0007841 A1* | 1/2007 | Tamaoka | F16C 17/107 310/156.45 |
| 2007/0024136 A1* | 2/2007 | Saito | F16C 17/102 310/90 |
| 2007/0211971 A1* | 9/2007 | Obara | F16C 33/107 384/119 |
| 2008/0030895 A1* | 2/2008 | Obara | F16C 17/107 360/99.08 |
| 2008/0112306 A1* | 5/2008 | Hirata | F16C 17/107 369/269 |
| 2009/0168639 A1* | 7/2009 | Tamaoka | G11B 19/2009 369/270.1 |
| 2009/0285514 A1* | 11/2009 | Hori | F16C 17/107 384/107 |
| 2010/0239196 A1* | 9/2010 | Yamamoto | F16C 17/107 384/118 |
| 2012/0051677 A1* | 3/2012 | Park | F16C 17/107 384/123 |
| 2013/0216168 A1* | 8/2013 | Konno | F16C 33/745 384/112 |
| 2014/0140644 A1* | 5/2014 | Flores | F16C 32/0666 384/123 |
| 2015/0043844 A1* | 2/2015 | Hori | F16C 33/104 384/114 |
| 2015/0110649 A1* | 4/2015 | Tamaoka | F04D 25/0613 417/354 |

* cited by examiner

|  | FIRST DYNAMIC PRESSURE GROOVES | SECOND DYNAMIC PRESSURE GROOVES |
|---|---|---|
| (1) | 25.20 | 21.84 |
| (2) | 29.63 | 21.67 |
| (3) | 21.32 | 19.77 |
| (4) | 21.18 | 16.78 |
| (5) | 33.12 | 14.27 |
| (6) | 33.80 | 14.19 |
| (7) | 22.56 | 16.88 |
| (8) | 19.08 | 20.09 |
| (9) | 22.42 | 20.83 |
| (10) | 24.23 | 18.65 |
| (11) | 29.69 | 16.26 |
| (12) | 34.00 | 16.60 |
| (13) | 25.69 | 19.38 |
| (14) | 18.07 | 21.39 |
| (15) |  | 20.08 |
| (16) |  | 16.41 |
| (17) |  | 13.68 |
| (18) |  | 14.10 |
| (19) |  | 17.00 |
| (20) |  | 20.13 |

Fig.6

FLUID BEARING APPARATUS, MOTOR, AND DISK DRIVE APPARATUS

CROSS REFERENCE TO RELATED APPLICATIONS

This application claims the benefit of priority to Japanese Patent Application No. 2017-088596 filed on Apr. 27, 2017. The entire contents of this application are hereby incorporated herein by reference.

BACKGROUND OF THE INVENTION

1. Field of the Invention

The present invention relates to a fluid bearing apparatus, a motor, and a disk drive apparatus.

2. Description of the Related Art

A disk drive apparatus, such as, for example, a hard disk drive, has been known. A motor arranged to rotate a disk is typically installed in the disk drive apparatus. The motor is arranged to rotate at a high speed with, for example, a dynamic pressure bearing being arranged between a rotor and a stator. A known rotary apparatus is described in, for example, JP-A 2000-199520. The rotary apparatus described in JP-A 2000-199520 includes a radial fixed member and a rotating unit capable of rotating with respect to the radial fixed member. A dynamic pressure bearing portion arranged opposite to both the radial fixed member and the rotating unit includes a plurality of dynamic pressure generating grooves arranged at regular intervals. Each of the dynamic pressure generating grooves is arranged to be different in length or depth. Thus, the rotary apparatus is able to achieve a capability to rotate at a high speed with stability.

SUMMARY OF THE INVENTION

In the rotary apparatus described in JP-A 2000-199520, the dynamic pressure generating grooves are arranged at regular intervals in a circumferential direction about a rotation axis. When the dynamic pressure generating grooves are arranged at regular intervals, noise at a specific frequency corresponding to the interval may noticeably occur. The rotary apparatus described in JP-A 2000-199520 may not be able to prevent occurrence of such noise at a specific frequency.

A fluid bearing apparatus according to a preferred embodiment of the present invention includes a stationary member including a bearing surface; and a rotating member arranged to rotate about a rotation axis with respect to the stationary member, and including a bearing surface. The bearing surface of the stationary member and the bearing surface of the rotating member are arranged opposite to each other with a minute gap therebetween, the minute gap having a fluid arranged therein. At least one of the bearing surfaces includes a first dynamic pressure groove array. The first dynamic pressure groove array includes a plurality of first dynamic pressure grooves arranged unevenly at irregular intervals in a circumferential direction.

The above preferred embodiment of the present invention is able to reduce the likelihood that noise at a specific frequency will occur while the rotating member is rotating.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a table showing, in numerical form, arrangement angles of the first dynamic pressure grooves and the second dynamic pressure grooves arranged about the rotation axis as a center according to a preferred embodiment of the present invention.

DETAILED DESCRIPTION OF THE PREFERRED EMBODIMENTS

Hereinafter, preferred embodiments of the present invention will be described with reference to the accompanying drawings. In the present application, spindle motors according to preferred embodiments of the present invention will be described as examples of motors including a fluid bearing apparatus. It is assumed herein that a direction parallel to a rotation axis of a motor is referred to by the term "axial direction", "axial", or "axially", that directions perpendicular to the rotation axis of the motor are each referred to by the term "radial direction", "radial", or "radially", and that a direction along a circular arc centered on the rotation axis of the motor is referred to by the term "circumferential direction", "circumferential", or "circumferentially". It is also assumed herein that an axial direction is a vertical direction, and that a side on which a stator unit is arranged with respect to a base portion is defined as an upper side. The shape of each member or portion and relative positions of different members or portions will be described based on the above assumptions. It should be noted, however, that the above definitions of the vertical direction and the upper and lower sides are not meant to restrict in any way the orientation of a motor or a disk drive apparatus according to any preferred embodiment of the present invention when in use.

Also note that the term "parallel" as used herein includes both "parallel" and "substantially parallel". Also note that the term "perpendicular" as used herein includes both "perpendicular" and "substantially perpendicular".

Figure 1:
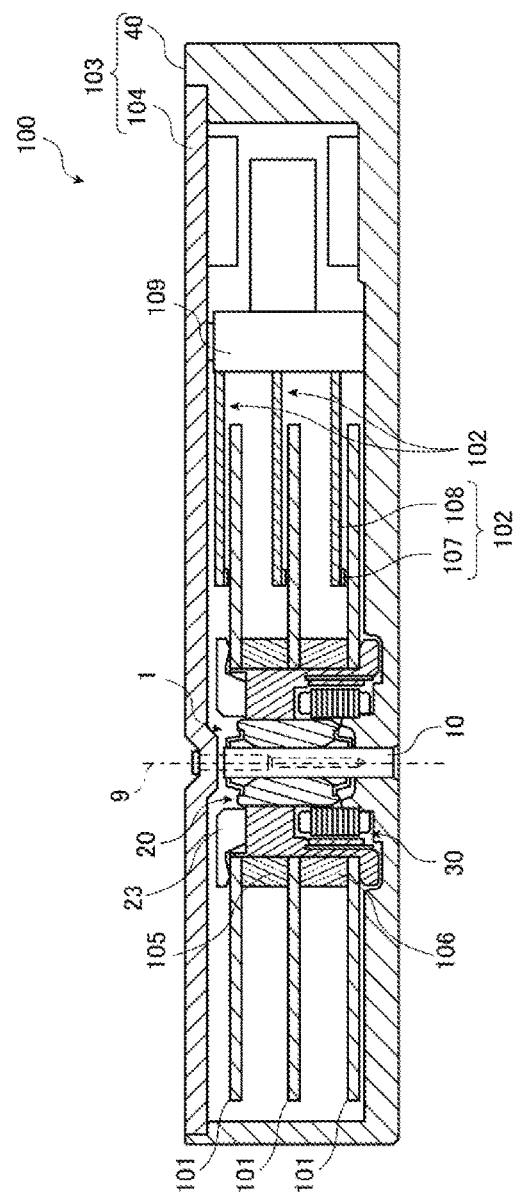
FIG. 1 is a sectional view of a disk drive apparatus according to a preferred embodiment of the present invention.

FIG. 1 is a sectional view of a disk drive apparatus 100 according to a preferred embodiment of the present invention.

The disk drive apparatus 100 is a hard disk drive arranged to rotate three magnetic disks 101 and perform reading and writing of information from or to the magnetic disks 101 while rotating the magnetic disks 101. The disk drive apparatus 100 includes a spindle motor 1, the three magnetic disks 101, three access portions 102, and a housing 103 arranged to house the spindle motor 1, the magnetic disks 101, and the access portions 102.

The housing 103 includes a base portion 40 and a cover member 104. The base portion 40 defines a portion of the spindle motor 1, which will be described below. The base portion 40 is molded by, for example, casting. The base portion 40 is an aluminum die-casting. The base portion 40 has an opening. The cover member 104 is fitted to the opening of the base portion 40. The housing 103 is defined as a result. A shaft 10, a rotating portion 20, and a stator unit 30 of the spindle motor 1, which will be described below, are housed in an interior space of the housing 103. The base portion 40 and the cover member 104 are combined so as to maintain airtightness of the interior space of the housing 103.

The interior space of the housing 103 is filled with a gas having a density lower than that of air, e.g., a helium gas. Use of the helium gas in the interior space of the housing 103 will lead to reductions in wind noise and the like while the magnetic disks 101 are rotating. Note that the interior space of the housing 103 may alternatively be filled with a hydrogen gas, air, or the like.

Each of the magnetic disks 101 is a medium on which information is recorded. The magnetic disks 101 are placed one above another along a rotation axis 9 extending in the vertical direction with a spacer 105 and a spacer 106 arranged between adjacent ones of the magnetic disks 101. In addition, each of the magnetic disks 101 is supported by the spindle motor 1, which will be described in detail below. The magnetic disks 101 are caused by the spindle motor 1 to rotate about the rotation axis 9.

Each access portion 102 includes a head 107 and an arm 108. The head 107 is arranged in close proximity to a surface of a corresponding one of the magnetic disks 101 to magnetically perform at least one of reading of information recorded on the corresponding magnetic disk 101 and writing of information to the corresponding magnetic disk 101. The head 107 is supported by the arm 108. The arm 108 is supported by a head actuator mechanism 109. That is, each access portion 102 is supported by the head actuator mechanism 109.

Figure 2:
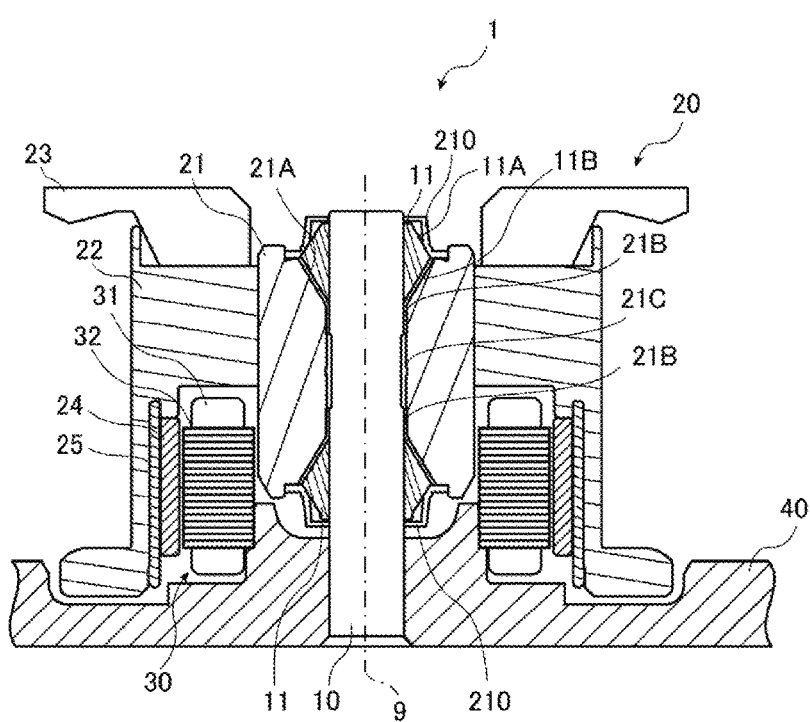
FIG. 2 is an enlarged view of a spindle motor of the disk drive apparatus illustrated in FIG. 1.

FIG. 2 is an enlarged view of the spindle motor 1 illustrated in FIG. 1.

The spindle motor 1 includes the shaft 10, two annular members 11, the rotating portion 20, the stator unit 30, and the base portion 40. The spindle motor 1 according to the present preferred embodiment is a three-phase motor. Each of spindle motors according to exemplary preferred embodiments of the present invention described below is also a three-phase motor.

The shaft 10 is a substantially columnar member arranged to extend along the rotation axis 9. The shaft 10 is arranged to support the rotating portion 20 such that the rotating portion 20 is capable of rotating about the rotation axis 9. The shaft 10 is made of, for example, a metal such as stainless steel or the like. An upper end portion of the shaft 10 is fixed to the cover member 104 of the housing 103. A lower end portion of the shaft 10 is fixed to the base portion 40.

The two annular members 11 are arranged on an outer circumferential surface of the shaft 10. The two annular members are arranged on an upper portion and a lower portion, respectively, of the shaft 10 while being axially spaced from each other. Each annular member 11 is a member arranged to project radially outward from the outer circumferential surface of the shaft 10, and fixed to or integrally molded with the shaft 10. The one of the annular members 11 which is fixed to the shaft 10 on the axially upper side will be described in the following description.

An outer circumferential surface of the annular member 11 includes an outer circumferential surface 11A arranged above a substantial middle thereof in the axial direction, and an outer circumferential surface 11B arranged below the substantial middle thereof in the axial direction. The outer circumferential surface 11A is arranged to gradually decrease in diameter with increasing height. Meanwhile, the outer circumferential surface 11B is arranged to gradually decrease in diameter with decreasing height. The shaft 10 and the annular members 11 together define a "stationary member" according to a preferred embodiment of the present invention.

The rotating portion 20 is a rotating member arranged to rotate about the rotation axis 9 with respect to the shaft 10 and the annular members 11. The rotating portion 20 includes a sleeve 21, a rotor hub 22, a clamp member 23 (see FIG. 1), a rotor magnet 24, and a yoke 25.

The sleeve 21 is arranged to be capable of rotating about the rotation axis 9 with respect to the shaft 10 and the annular members 11. The sleeve 21 includes a first inner circumferential surface 21A arranged opposite to the outer circumferential surface 11B of the annular member 11, and a second inner circumferential surface 21B arranged opposite to the outer circumferential surface of the shaft 10. The first and second inner circumferential surfaces 21A and 21B of the sleeve 21 are arranged opposite to the outer circumferential surface 11B of the annular member 11 and the outer circumferential surface of the shaft 10, respectively, with a minute gap therebetween. The minute gap has a fluid, such as, for example, a lubricating oil, arranged therein. The second inner circumferential surface 21B includes a groove 21C recessed radially outward. The groove 21C is used as a groove through which air circulates to stabilize surfaces of the fluid.

The first inner circumferential surface 21A is a thrust bearing surface arranged opposite to the outer circumferential surface 11B of the annular member 11. The second inner circumferential surface 21B is a radial bearing surface arranged opposite to the outer circumferential surface of the shaft 10. Each of the first and second inner circumferential surfaces 21A and 21B includes a dynamic pressure groove array arranged to generate a dynamic pressure in the fluid. The dynamic pressure groove arrays will be described in detail below. The shaft 10, the annular members 11, and the sleeve 21 together define a "fluid bearing apparatus" according to a preferred embodiment of the present invention.

Seal members 210 are arranged on both the axially upper and lower sides of the sleeve 21 to prevent the fluid from leaking out of the spindle motor 1. The seal members 210 are arranged to cover the annular members 11 and upper and lower surfaces of the sleeve 21, and are fixed to the sleeve 21.

The rotor hub 22 is cylindrical. The rotor hub 22 is supported by the sleeve 21. In addition, the rotor hub 22 is arranged to rotate about the rotation axis 9 together with the sleeve 21. The sleeve 21 and the rotor hub 22 may be defined either by a single continuous monolithic member or by separate members. A metal such as an aluminum alloy, ferromagnetic stainless steel, or the like, for example, is used as a material of each of the sleeve 21 and the rotor hub 22.

The clamp member 23 is supported by the rotor hub 22. As illustrated in FIG. 1, the clamp member 23 is arranged to support the magnetic disks 101 between the clamp member 23 and the rotor hub 22. The magnetic disks 101 are thus arranged to rotate about the rotation axis 9 while being supported by the rotating portion 20.

The rotor magnet 24 is fixed to an inner circumferential surface of the rotor hub 22 with the yoke 25 therebetween. The rotor magnet 24 is in the shape of a circular ring, and is centered on the rotation axis 9. An inner circumferential surface of the rotor magnet 24 is a pole surface in which north and south poles alternate with each other in a circumferential direction.

The stator unit 30 is arranged radially inside of the rotor hub 22. The stator unit 30 is arranged to generate a torque to rotate the rotating portion 20. The stator unit 30 includes a plurality of coils 31 and a stator core 32.

The stator core 32 is a laminated structure defined by laminated magnetic bodies each of which is in the shape of a circular ring and is centered on the rotation axis 9. The stator core 32 is fixed to the base portion 40. The stator core 32 includes a plurality of teeth arranged to project radially outward.

The coils 31 are wound around the teeth, and are arranged in an annular shape with the rotation axis 9 as a center. The coils 31 are made up of three coil groups. The three coil groups are a coil group for a U phase, a coil group for a V phase, and a coil group for a W phase. Each coil group is defined by one conducting wire. The coils 31 and the stator core 32 are arranged radially opposite to the rotor magnet 24. Once an electric drive current is supplied to the coils 31, radial magnetic flux is generated. The generated magnetic flux interacts with magnetic flux of the rotor magnet 24 to produce a torque to rotate the rotating portion 20 about the rotation axis 9.

Figure 3:
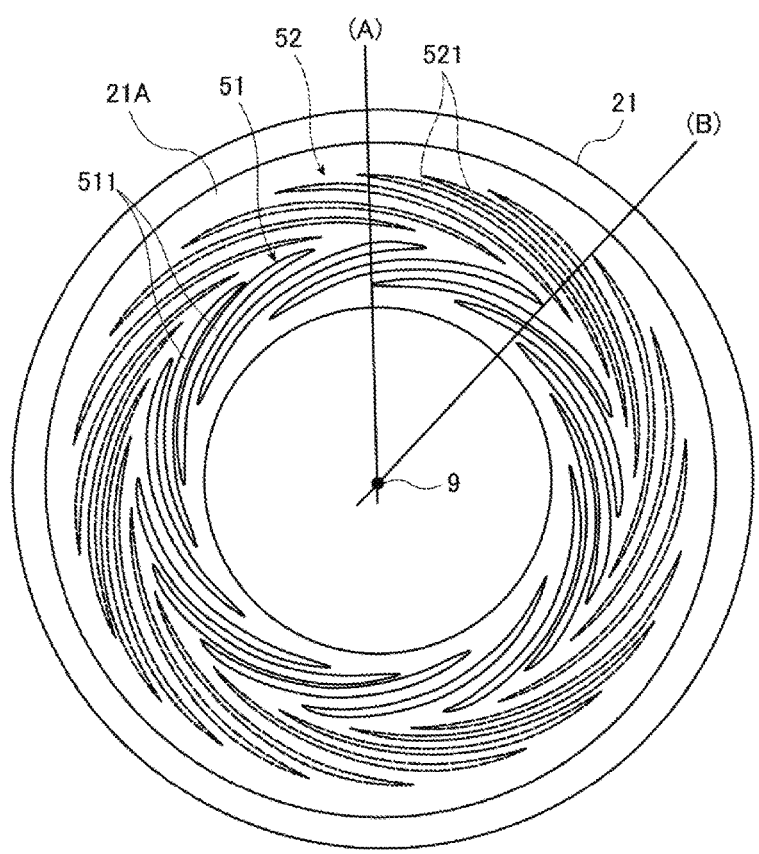
FIG. 3 is a plan view of a first inner circumferential surface of a sleeve according to a preferred embodiment of the present invention as viewed from above along a rotation axis.

FIG. 3 is a plan view of the first inner circumferential surface 21A of the sleeve 21 as viewed from above along the rotation axis 9.

A first dynamic pressure groove array 51 and a second dynamic pressure groove array 52 are defined in the first inner circumferential surface 21A. Note that, although the first and second dynamic pressure groove arrays 51 and 52 are defined in the same first inner circumferential surface 21A, the second dynamic pressure groove array 52 is represented by dashed lines in FIG. 3 for the sake of convenience in description.

The first dynamic pressure groove array 51 includes a plurality (fourteen in the present preferred embodiment) of first dynamic pressure grooves 511. Each first dynamic pressure groove 511 is shaped like a crescent, with side lines thereof each of which joins a first end and a second end thereof being curved. The first end of each first dynamic pressure groove 511 is arranged radially inward of the second end thereof. The first dynamic pressure grooves 511 are arranged unevenly at irregular intervals in the circumferential direction. In addition, the first end of each of the first dynamic pressure grooves 511 is arranged to overlap with at least two of the other first dynamic pressure grooves 511 when viewed in a radial direction as indicated by line segment (A) in FIG. 3.

The wording "at irregular intervals" as used here means that the circumferential interval between adjacent ones of the first dynamic pressure grooves 511 is not constant. In more detail, an interval between the first ends of adjacent ones of the first dynamic pressure grooves 511 is different from an interval between the second ends of the adjacent ones of the first dynamic pressure grooves 511. In addition, the wording "unevenly" as used here means that the fourteen first dynamic pressure grooves 511 are arranged in the circumferential direction with the interval between every adjacent ones of the first dynamic pressure grooves 511 being different. The wording "unevenly" will be explained in more detail below.

The second dynamic pressure groove array 52 includes a plurality (twenty in the present preferred embodiment) of second dynamic pressure grooves 521. Each second dynamic pressure groove 521 is shaped like a crescent, with side lines thereof each of which joins a first end and a second end thereof being curved. The second end of each second dynamic pressure groove 521 is arranged radially outward of the first end thereof. The second dynamic pressure grooves 521 are arranged unevenly at irregular intervals in the circumferential direction on the radially outer side of the first dynamic pressure grooves 511. None of the second dynamic pressure grooves 521 is continuous with any of the first dynamic pressure grooves 511. In addition, the second end of each of the first dynamic pressure grooves 511 is arranged to overlap with at least three (four in FIG. 3) of the second dynamic pressure grooves 521 when viewed in a radial direction as indicated by line segment (B) in FIG. 3.

Note that another first inner circumferential surface 21A is defined in a lower portion of the sleeve 21, and that this first inner circumferential surface 21A also includes a first dynamic pressure groove array and a second dynamic pressure groove array as illustrated in FIG. 3.

Figure 4:
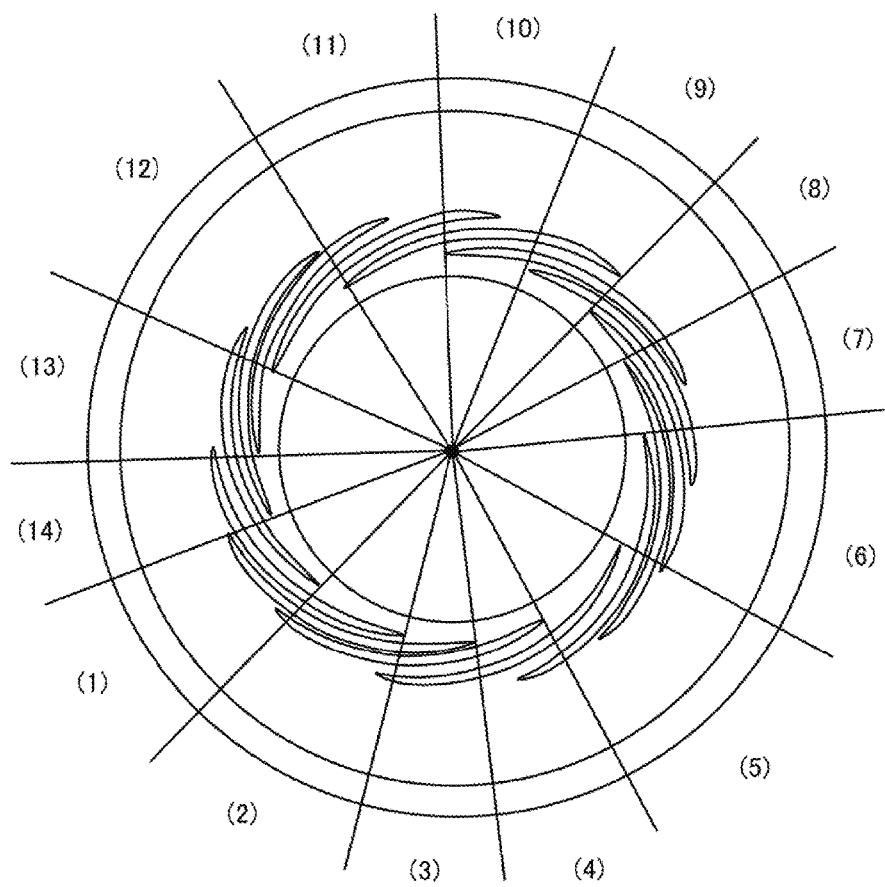
FIG. 4 is a diagram for explaining a plurality of first dynamic pressure grooves arranged unevenly according to a preferred embodiment of the present invention.
Figure 5:
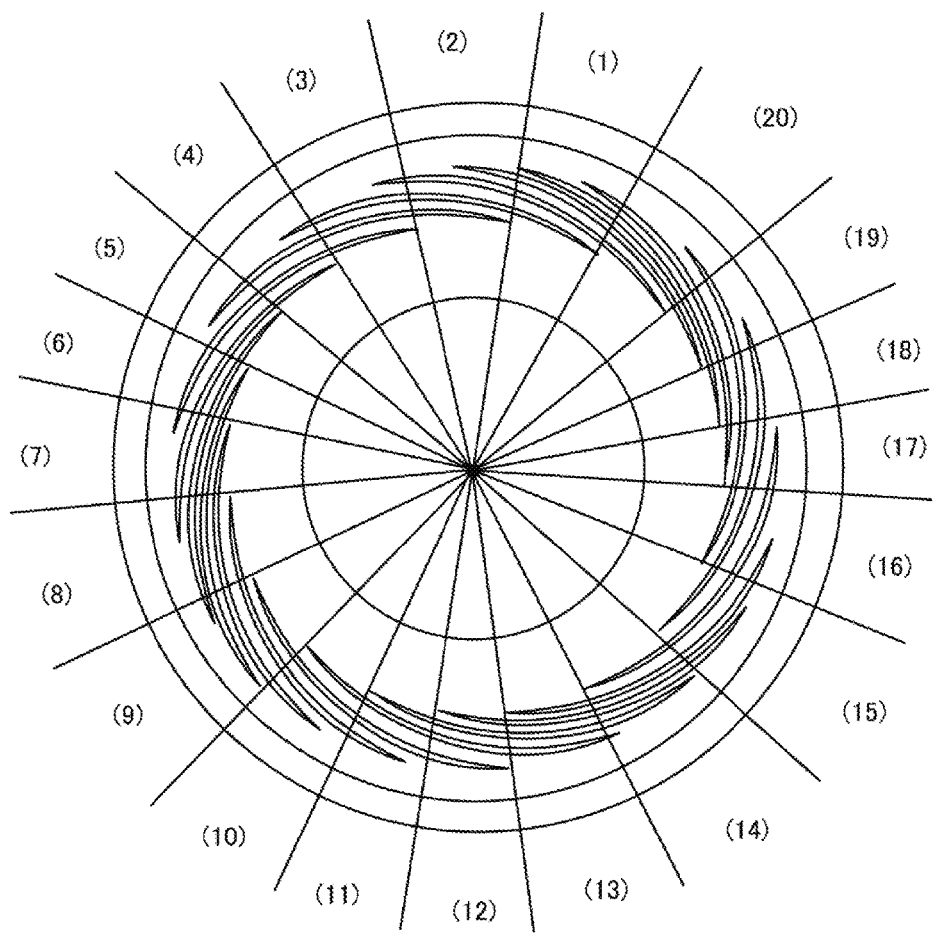
FIG. 5 is a diagram for explaining a plurality of second dynamic pressure grooves arranged unevenly according to a preferred embodiment of the present invention.

FIG. 4 is a diagram for explaining the first dynamic pressure grooves 511 arranged unevenly. FIG. 5 is a diagram for explaining the second dynamic pressure grooves 521 arranged unevenly. FIG. 6 is a table showing, in numerical form, arrangement angles of the first dynamic pressure grooves 511 and the second dynamic pressure grooves 521 arranged about the rotation axis 9 as a center. In FIG. 4, the second dynamic pressure grooves 521 are not shown. In FIG. 5, the first dynamic pressure grooves 511 are not shown.

Numerical values in parentheses in FIG. 6, i.e., (1), (2), and so on, correspond to numerical values in parentheses in FIGS. 4 and 5. For example, an angle of section (1) in FIG. 4 is 25.20°. Moreover, an angle of section (1) in FIG. 5 is 21.84°.

The fourteen first dynamic pressure grooves 511 are arranged in the circumferential direction at intervals of 25.20°, 29.63°, 21.32°, 21.18°, 33.12°, 33.80°, 22.56°, 19.08°, 22.42°, 24.23°, 29.69°, 34.00°, 25.69°, and 18.07° with a specific circumferential position as a starting position. In the present preferred embodiment, the first ends of the first dynamic pressure grooves 511 are arranged at the intervals noted above. Note, however, that the second ends of the first dynamic pressure grooves 511 may alternatively be arranged at the intervals noted above. Also note that middle points of the first dynamic pressure grooves 511 may alternatively be arranged at the intervals noted above.

Similarly, the twenty second dynamic pressure grooves 521 are arranged in the circumferential direction at intervals of 21.84°, 21.67°, 19.77°, 16.78°, 14.27°, 14.19°, 16.88°, 20.09°, 20.83°, 18.65°, 16.26°, 16.60°, 19.38°, 21.39°, 20.08°, 16.41°, 13.68°, 14.10°, 17.00°, and 20.13° with a specific circumferential position as a starting position. In the present preferred embodiment, the second ends of the second dynamic pressure grooves 521 are arranged at the intervals noted above. Note, however, that the first ends of the second dynamic pressure grooves 521 may alternatively be arranged at the intervals noted above. Also note that middle points of the second dynamic pressure grooves 521 may alternatively be arranged at the intervals noted above.

Figure 7:
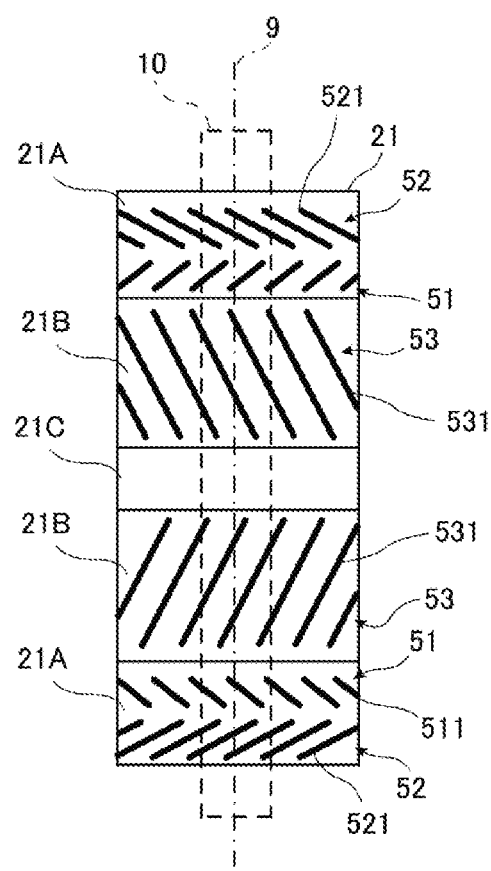
FIG. 7 is a planar view of the first inner circumferential surfaces and a second inner circumferential surface of the sleeve according to a preferred embodiment of the present invention as viewed from radially inside.

FIG. 7 is a planar view of the first and second inner circumferential surfaces 21A and 21B of the sleeve 21 as viewed from radially inside. In FIG. 7, the shaft 10 is represented by a dashed line. Also note that, although each of the first and second dynamic pressure grooves 511 and 521 is shaped like a crescent, each of the first and second dynamic pressure grooves 511 and 521 is represented by a straight line in FIG. 7.

A third dynamic pressure groove array 53 is defined in the second inner circumferential surface 21B. The third dynamic pressure groove array 53 includes a plurality of third dynamic pressure grooves 531 arranged in the circumferential direction. The third dynamic pressure grooves 531 may be arranged at either regular or irregular intervals. The shape of each third dynamic pressure groove 531 is not limited to particular shapes. The number of third dynamic pressure grooves 531 may be determined as appropriate. However, it is preferable that the following inequality holds: N1<N3<N2, where N1 denotes the number of first dynamic pressure grooves 511, N2 denotes the number of second dynamic pressure grooves 521, and N3 denotes the number of third dynamic pressure grooves 531. For example, when the number of first dynamic pressure grooves 511 is fourteen, and the number of second dynamic pressure grooves 521 is twenty as described above, the number of third dynamic pressure grooves 531 is, for example, fifteen.

As described above, the dynamic pressure grooves are defined in the first and second inner circumferential surfaces 21A and 21B of the sleeve 21, and thus, the sleeve 21 can be prevented from making contact with any of the shaft 10 and the annular members 11 with the minute gap therebetween. Further, since the first dynamic pressure grooves 511 are arranged unevenly at irregular intervals in the first inner circumferential surface 21A, which is the thrust bearing surface, occurrence of noise at a specific frequency can be prevented. Furthermore, since the second dynamic pressure grooves 521 are additionally arranged unevenly at irregular intervals in the first inner circumferential surface 21A, which is the thrust bearing surface, occurrence of noise at a specific frequency can be prevented in connection with both the first and second dynamic pressure groove arrays 51 and 52.

While a preferred embodiment of the present invention has been described above, it is to be understood that the present invention is not limited to the above-described preferred embodiment.

Note that the number of first dynamic pressure grooves 511 and the number of second dynamic pressure grooves 521 are not limited to the numerical values according to the above-described preferred embodiment. The number of first dynamic pressure grooves 511 and the number of second dynamic pressure grooves 521 may be modified appropriately in accordance with the rotation rate of the spindle motor 1. For example, it is preferable that the number, N, of first dynamic pressure grooves 511 satisfies the following inequality: $500<(R/60)*N<5000$, where N denotes the number of first dynamic pressure grooves 511, and R denotes the rotation rate of the spindle motor 1. The same is also true of the second dynamic pressure grooves 521.

Also note that the intervals at which the first dynamic pressure grooves 511 are arranged are not limited to the numerical values according to the above-described preferred embodiment. On the assumption that N denotes the number of first dynamic pressure grooves 511, it may be sufficient if the first dynamic pressure grooves 511 are arranged at intervals of $(360°/N)\pm10°$ or $(360°/N)\pm(150°/N)$ in the circumferential direction. The same is also true of the second dynamic pressure grooves 521.

Note that, although the first and second dynamic pressure groove arrays 51 and 52 are defined in the first inner circumferential surface 21A of the sleeve 21 in the above-described preferred embodiment, the first and second dynamic pressure groove arrays 51 and 52 may alternatively be defined in the outer circumferential surface 11B of the annular member 11. Also note that, although the third dynamic pressure groove array 53 is defined in the second inner circumferential surface 21B of the sleeve 21 in the above-described preferred embodiment, the third dynamic pressure groove array 53 may alternatively be defined in the outer circumferential surface of the shaft 10.

Also note that the structure of the fluid bearing apparatus is not limited to the structure of the fluid bearing apparatus according to the above-described preferred embodiment. In fluid bearing apparatuses according to other preferred embodiments of the present invention, a shaft 10 may be arranged to rotate about a rotation axis 9, for example. Two examples of fluid bearing apparatuses according to preferred embodiments of the present invention will be described below. Each of FIGS. 8 and 9 is a diagram illustrating the exemplary structure of a fluid bearing apparatus according to another preferred embodiment of the present invention.

Figure 8:
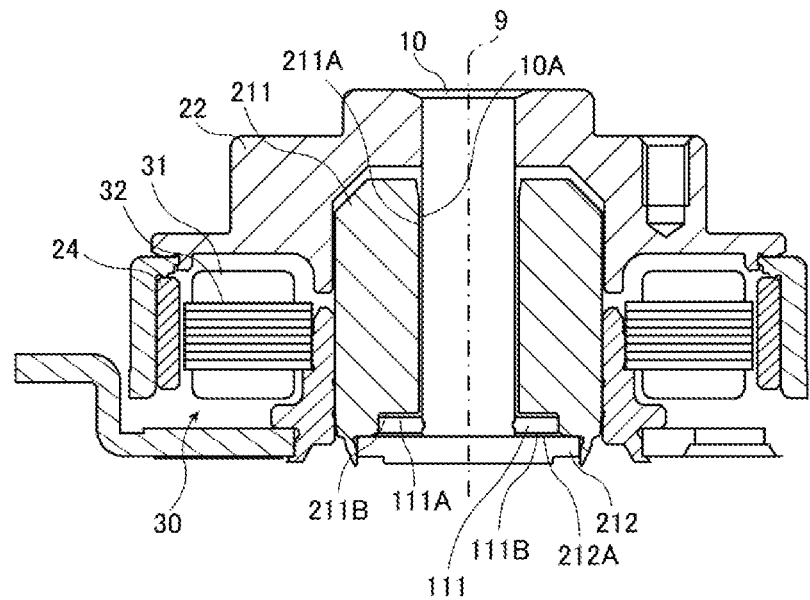
FIG. 8 is a diagram illustrating the exemplary structure of a fluid bearing apparatus according to another preferred embodiment of the present invention.

In the fluid bearing apparatus illustrated in FIG. 8, a sleeve 211 is arranged radially outside of a shaft 10 with a minute gap therebetween. In addition, a cap 212 is arranged below the shaft 10. The shaft 10 is rotatably supported by the sleeve 211 and the cap 212. A rotor hub 22 is fixed to an upper end portion of the shaft 10. In addition, the shaft 10 and the rotor hub 22 are arranged to rotate together. A third dynamic pressure groove array is defined in one of an outer circumferential surface 10A of the shaft 10 and an inner circumferential surface 211A of the sleeve 211, which are opposite to each other. Note that third dynamic pressure groove arrays may be arranged at two axial positions away from each other, and that only one third dynamic pressure groove array may be provided.

An annular member 111 is fixed to a lower end portion of the shaft 10. The shaft 10 and the annular member 111 may be defined either by separate members or by a single monolithic member. An axially upper surface 111A of the annular member 111 is arranged opposite to a lower surface 211B of the sleeve 211 with a minute gap therebetween. In addition, an axially lower surface 111B of the annular member 111 is arranged opposite to an upper surface 212A of the cap 212 with a minute gap therebetween. A first dynamic pressure groove array and a second dynamic pressure groove array are defined in one of the upper surface 111A of the annular member 111 and the lower surface 211B of the sleeve 211. In addition, a first dynamic pressure groove array and a second dynamic pressure groove array are defined also in one of the lower surface 111B of the annular member 111 and the upper surface 212A of the cap 212.

Figure 9:
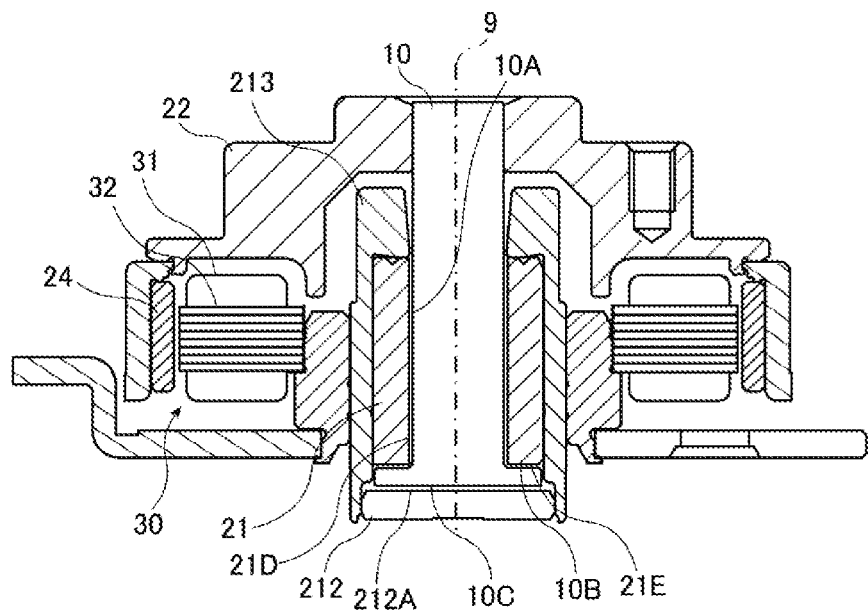
FIG. 9 is a diagram illustrating the exemplary structure of a fluid bearing apparatus according to yet another preferred embodiment of the present invention.

In the fluid bearing apparatus illustrated in FIG. 9, a bearing housing 213 and a sleeve 21 are arranged radially outside of a shaft 10 with a minute gap therebetween. In addition, a cap 212 is arranged below the shaft 10. The shaft 10 is rotatably supported by the sleeve 21, the bearing housing 213, and the cap 212. A third dynamic pressure groove array is defined in one of an outer circumferential surface 10A of the shaft 10 and an inner circumferential surface 21D of the sleeve 21, which are opposite to each other.

A lower end portion of the shaft 10 includes a radially projecting portion. An upper surface 10B of the radially projecting portion is arranged axially opposite to a lower surface 21E of the sleeve 21 with a minute gap therebetween. In addition, a lower surface 10C of the shaft 10 and an upper surface 212A of the cap 212 are arranged axially opposite to each other with a minute gap therebetween. A first dynamic pressure groove array and a second dynamic pressure groove array are defined in one of the lower surface 21E of the sleeve 21 and the upper surface 10B of the radially projecting portion of the lower end portion of the shaft 10. In addition, a first dynamic pressure groove array and a second dynamic pressure groove array are defined also in one of the lower surface 10C of the shaft 10 and the upper surface 212A of the cap 212.

Preferred embodiments of the present invention are applicable to, for example, fluid bearing apparatuses, motors, and disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fluid bearing apparatus comprising:
a stationary member including a bearing surface; and
a rotating member arranged to rotate about a rotation axis with respect to the stationary member, and including a bearing surface; wherein
the bearing surface of the stationary member and the bearing surface of the rotating member are arranged opposite to each other with a minute gap therebetween, the minute gap having a fluid arranged therein;
at least one of the bearing surfaces includes a first dynamic pressure groove array; and
the first dynamic pressure groove array includes a plurality of first dynamic pressure grooves arranged unevenly at irregular increasing and decreasing alternating intervals extending in a circumferential direction.

2. The fluid bearing apparatus according to claim 1, wherein
at least one of the bearing surfaces includes a second dynamic pressure groove array; and
the second dynamic pressure groove array includes a plurality of second dynamic pressure grooves arranged unevenly at irregular increasing and decreasing alternating intervals extending in the circumferential direction on a radially outer side of the first dynamic pressure groove array.

3. The fluid bearing apparatus according to claim 2, wherein none of the first dynamic pressure grooves is continuous with any of the second dynamic pressure grooves.

4. The fluid bearing apparatus according to claim 2, wherein
each of the first and second dynamic pressure grooves includes a first end and a second end, the first end being one end in the circumferential direction, the second end being another end in the circumferential direction; and
the first end is arranged radially inward of the second end.

5. The fluid bearing apparatus according to claim 4, wherein the first end of each of the first dynamic pressure grooves is arranged to overlap with at least two of the other first dynamic pressure grooves when viewed in a radial direction.

6. The fluid bearing apparatus according to claim 4, wherein the second end of each of the first dynamic pressure grooves is arranged to overlap with at least three of the second dynamic pressure grooves when viewed in a radial direction.

7. The fluid bearing apparatus according to claim 2, wherein the first dynamic pressure grooves or the second dynamic pressure grooves are N in number, and are arranged at intervals of $(360°/N)\pm10°$ in the circumferential direction.

8. The fluid bearing apparatus according to claim 2, wherein the first dynamic pressure grooves or the second dynamic pressure grooves are N in number, and are arranged at intervals of $(360°/N)\pm(150°/N)$ in the circumferential direction.

9. The fluid bearing apparatus according to claim 2, wherein $500<(R/60)*N<5000$, where N denotes a number of first dynamic pressure grooves or second dynamic pressure grooves, and R denotes a rotation rate of the rotating member.

10. The fluid bearing apparatus according to claim 2, wherein
the stationary member includes:
a shaft arranged to extend along the rotation axis; and
annular members arranged on an outer circumferential surface of the shaft, and on an upper portion and a lower portion, respectively, of the shaft while being axially spaced from each other;
the rotating member includes a radial bearing surface arranged opposite to the shaft, and supported through a lubricating oil to be rotatable about the rotation axis with respect to the shaft and the annular members, and at least one thrust bearing surface arranged opposite to one of the annular members, and arranged on at least one axial side of the radial bearing surface;
the at least one thrust bearing surface includes the first and second dynamic pressure groove arrays; and
the radial bearing surface includes a third dynamic pressure groove array including a plurality of third dynamic pressure grooves arranged in the circumferential direction.

11. The fluid bearing apparatus according to claim 10, wherein $N1<N3<N2$, where N1 denotes a number of first dynamic pressure grooves, N2 denotes a number of second dynamic pressure grooves, and N3 denotes a number of third dynamic pressure grooves.

12. The fluid bearing apparatus according to claim 10, wherein
the first dynamic pressure grooves included in the first dynamic pressure groove array are fourteen in number;
the second dynamic pressure grooves included in the second dynamic pressure groove array are twenty in number; and
the third dynamic pressure grooves included in the third dynamic pressure groove array are fifteen in number.

13. The fluid bearing apparatus according to claim 12, wherein the first dynamic pressure grooves are arranged in the circumferential direction at intervals of 25.20°, 29.63°, 21.32°, 21.18°, 33.12°, 33.80°, 22.56°, 19.08°, 22.42°, 24.23°, 29.69°, 34.00°, 25.69°, and 18.07° with a specific circumferential position as a starting position.

14. The fluid bearing apparatus according to claim 12, wherein the second dynamic pressure grooves are arranged in the circumferential direction at intervals of 21.84°, 21.67°, 19.77°, 16.78°, 14.27°, 14.19°, 16.88°, 20.09°, 20.83°, 18.65°, 16.26°, 16.60°, 19.38°, 21.39°, 20.08°, 16.41°, 13.68°, 14.10°, 17.00°, and 20.13° with a specific circumferential position as a starting position.

15. A motor comprising the fluid bearing apparatus of claim 1.

16. A disk drive apparatus comprising:
the motor of claim 15;
a housing having an interior space to house the motor;
a disk supported by the motor in the interior space of the housing;
an access portion arranged to perform at least one of reading and writing of information from or to the disk; and
a head actuator mechanism arranged to support the access portion.

* * * * *